United States Patent
Dong et al.

(10) Patent No.: US 8,325,024 B2
(45) Date of Patent: Dec. 4, 2012

(54) APPARATUS FOR PROVIDING HAPTIC FEEDBACK

(75) Inventors: Le-Ping Dong, Shenzhen (CN); Jie He, Shenzhen (CN); Lin Liu, Shenzhen (CN); Zheng-Ping Qin, Shenzhen (CN)

(73) Assignees: AAC Acoustic Technologies (Shenzhen) Co., Ltd., Shenzhen (CN); American Audio Components Inc., La Verne, CA (US)

( * ) Notice: Subject to any disclaimer, the term of this patent is extended or adjusted under 35 U.S.C. 154(b) by 338 days.

(21) Appl. No.: 12/855,526

(22) Filed: Aug. 12, 2010

(65) Prior Publication Data

US 2011/0187514 A1  Aug. 4, 2011

(30) Foreign Application Priority Data

Feb. 1, 2010  (CN) .................. 2010 2 9216028 U

(51) Int. Cl.
*H04B 3/36* (2006.01)
*H01L 41/00* (2006.01)
*H02N 2/00* (2006.01)
*G06F 3/01* (2006.01)

(52) U.S. Cl. ............... 340/407.1; 310/348; 310/328; 715/702

(58) Field of Classification Search .... 340/407.1–407.2; 74/87; 310/81, 327, 348, 357
See application file for complete search history.

(56) References Cited

U.S. PATENT DOCUMENTS

| | | | |
|---|---|---|---|
| 5,625,248 A * | 4/1997 | Saito et al. .................. 310/324 |
| 6,369,489 B1 * | 4/2002 | Sawai et al. ................. 310/326 |
| 6,587,567 B1 * | 7/2003 | Yamamoto .................. 381/190 |
| 7,579,758 B2 * | 8/2009 | Maruyama et al. ........... 310/348 |
| 7,755,607 B2 * | 7/2010 | Poupyrev et al. ............ 345/156 |
| 8,174,495 B2 * | 5/2012 | Takashima et al. ........... 345/156 |
| 8,233,646 B2 * | 7/2012 | Lutz et al. .................. 381/190 |

* cited by examiner

*Primary Examiner* — Benjamin C Lee
*Assistant Examiner* — Adam Carlson
(74) *Attorney, Agent, or Firm* — IPro, Inc.; Na Xu

(57) ABSTRACT

Disclosed is an apparatus used in an electronic device for providing haptic feedback. The apparatus includes a base defining a receiving space, a piezoelectricity vibrator suspended in the receiving space and being capable of vibrating in the receiving space, a pair of contacts partially accommodated in the base and electrically connected to the piezoelectricity vibrator, and a transmitting mass located above the piezoelectricity vibrator with a lower side abutting against the piezoelectricity vibrator.

10 Claims, 1 Drawing Sheet

APPARATUS FOR PROVIDING HAPTIC FEEDBACK

BACKGROUND OF THE INVENTION

1. Field of the Invention

The present invention generally relates to apparatuses for providing haptic feedbacks.

2. Description of Related Art

As disclosed in U.S. Pat. No. 7,535,454 B2, portable electronic devices, such as mobile phones, portable GPS navigations, laptop computers, generally have a number of buttons that allow a user to interface with the devices by inputting information. The capabilities of these devices are increasing while the size and weight are decreasing to enhance portability. For example, mobile phones, in addition to their traditional role as voice-communication devices, now include functions traditionally associated with other devices, such as electronic games, PDAs, and digital cameras.

To permit effective interaction with the handheld devices, the handheld devices typically provide visual and aural cues or feedback. In addition to conventional visual and aural feedback, some of these devices attempt to enhance the effectiveness of device feedback by providing tactile cues or feedback. Some devices utilize structural tactile methods. One such example is to provide raised surfaces on the input surface, e.g., a keypad, of the device. Such methods, however, are inherently static and thus cannot offer effective tactile feedback.

Active methods of providing tactile feedback include incorporating a vibrator into the handheld electronic devices. Such a method of providing haptic cues, however, generally vibrates the entire device. Such method or apparatuses are disclosed in U.S. Pat. No. 7,535,454 B2, U.S. Pat. No. 7,148,875 B2, U.S. Pat. No. 6,853,965 B2, U.S. Pat. No. 6,429,846 B2, U.S. Pat. No. 6,405,158 B2.

SUMMARY OF THE INVENTION

In one embodiment of the invention, an apparatus for proving haptic feedback includes a base defining a pair of through holes at two ends thereof, a pair of contacts partially accommodated in the through holes, a piezoelectricity vibrator suspended by the contacts with two ends electrically connected to the contacts, and a cover. The cover includes two pressing portions for pressing the two ends of the piezoelectricity vibrator on the contacts, a transmitting beam extending from one of the pressing portion to the other pressing portion, and a transmitting mass positioned to the transmitting beam with a lower side abutting against the piezoelectricity vibrator.

Alternatively, an apparatus includes a base defining a receiving space and including a pair of steps therein, a cover, a piezoelectricity vibrator suspended in the receiving space by the steps, and a pair of contacts partially accommodated in the base and electrically connected to the piezoelectricity vibrator. The cover includes two pressing portions for pressing the two ends of the piezoelectricity vibrator on the steps, a transmitting beam extending from one of the pressing portion to the other pressing portion, and a transmitting mass positioned to the transmitting beam with a lower side abutting against the piezoelectricity vibrator.

Other features of the present invention will become more apparent to those skilled in the art upon examination of the following drawings and detailed description of exemplary embodiments.

DETAILED DESCRIPTION OF THE PREFERRED EMBODIMENT

Reference will now be made to describe the exemplary embodiment of the present invention in detail.

The present invention is presented for providing the user with intensive interaction experience. For example, if a user taps on a touch screen of a portable gaming, the user will get a tactile feedback, such as vibration, from the touch screen.

Figure 1:
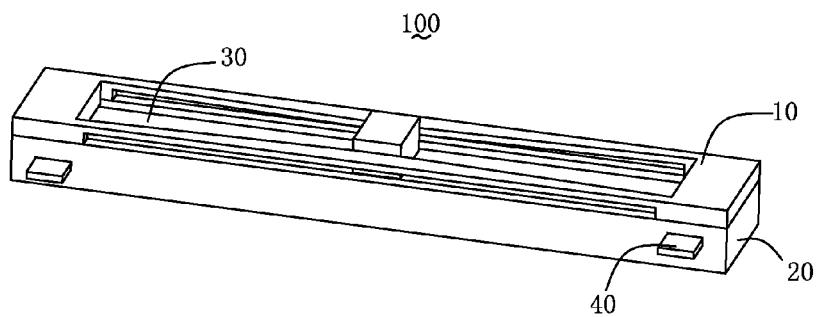
FIG. 1 is an isometric view of an apparatus for providing haptic feedback in accordance with an exemplary embodiment of the present invention.

Referring to FIG. 1, an apparatus 100 for providing haptic feedback, in accordance with an exemplary embodiment of the present invention, includes a base 20, a cover 10 forming a receiving space with the base 20, a piezoelectric vibrator 30 located between the base 20 and the cover 10, and a pair of contacts 40 electrically connected to the piezoelectric vibrator 30. A piezoelectric vibrator is a type of electric motor based upon the change in shape of a piezoelectric material when an electric field is applied. Piezoelectric vibrators make use of the converse piezoelectric effect whereby the material produces vibrations in order to produce a motion.

Figure 2:
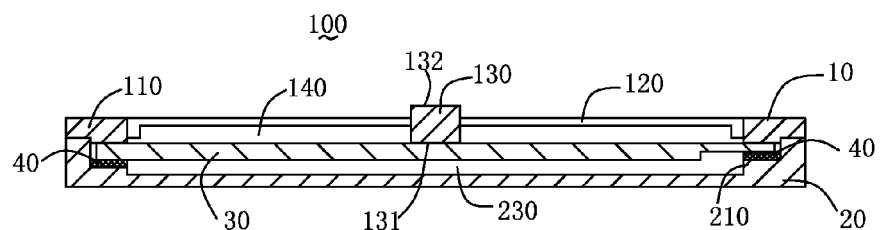
FIG. 2 is a cross-sectional view of the apparatus in FIG. 1.
Figure 3:
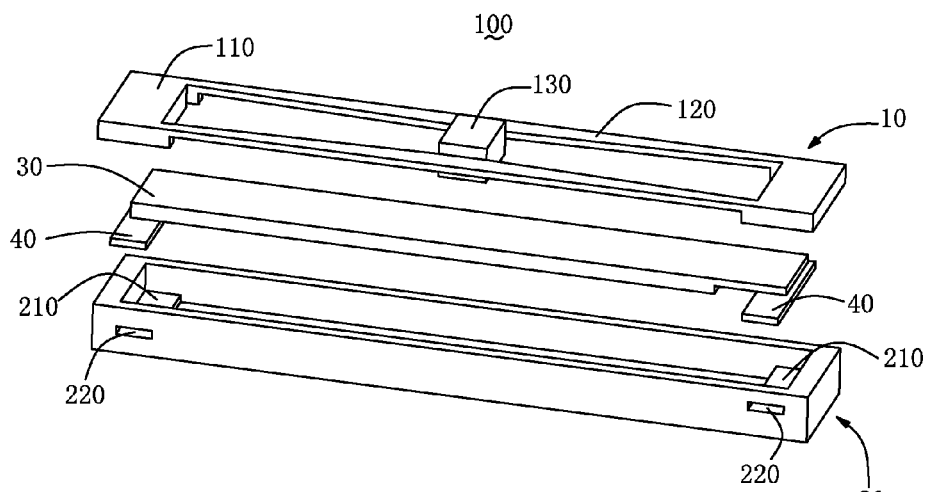
FIG. 3 is an exploded view of the apparatus in FIG. 1.

Referring to FIGS. 2-3, the base 20 defines a pair of through holes 220 for accommodating the corresponding contacts 40. While the contact 40 is assembled with the base 20, one end is beyond the base 20 and the other end is inside the base 20. The piezoelectricity vibrator 30 is received in the receiving space, with two ends thereof connected to the contacts 40. Corresponding to the two ends of the piezoelectricity vibrator 30, the base preferably defines two steps 210 for supporting the vibrator. Thus, the piezoelectricity vibrator 30 is suspended in the receiving space. In fact, the piezoelectricity vibrator 30 may also be directly supported by the contacts. While suspended, the piezoelectricity vibrator 30 departs from a bottom of the base 20 for forming a gap 230 for providing the vibrator with vibrating space.

The cover 10 includes a pair of pressing portions 110 for pressing on the two ends of the piezoelectricity vibrator 30, at least one transmitting beam 120 extending from one pressing portion to the other pressing portion, and a transmitting mass 130 extending from the transmitting beam 120. While the cover 10 is assembled with the base 20, two ends of the piezoelectricity vibrator 30 are sandwiched between the pressing portion 110 and the steps 210 or are sandwiched between the pressing portion 110 and the contacts 40. While assembled, a lower side 131 of the transmitting mass 130 abuts against the piezoelectricity vibrator 30, and an upper side 132 of the transmitting mass 130 abuts against a touch screen. When applied with an electric field, the piezoelectricity vibrator 30 vibrates and further drives the transmitting mass 130 to vibrate. The vibration is transmitted from the piezoelectricity vibrator 30 to the touch screen via the transmitting beam 120 and the transmitting mass 130.

While applied in an electronic device having an interactive interface, such as a mobile phone having a touch screen, the apparatus of the invention is capable of providing haptic feedback. When a user interacts with the mobile phone by tapping on the touch screen, the touch screen produces electrical signals to apply on the piezoelectricity vibrator 30. Then, the piezoelectricity vibrator 30 vibrates and provides the user with tactile haptic feedback via the touch screen.

In the above-mentioned exemplary embodiment, the cover 10 may be made of elastic material for providing the transmitting beam 120 with good elasticity. For providing the transmitting beam with sufficient deforming space, an interval 140 is defined between the transmitting beam 120 and the piezoelectricity vibrator 30.

In a preferable model, a pair of transmitting beam is provided for clamping the transmitting mass. In another preferable model, the transmitting mass defines an upper side protruding from the transmitting beam.

While the present invention has been described with reference to the specific embodiments, the description of the invention is illustrative and is not to be construed as limiting the invention. Various of modifications to the present invention can be made to the exemplary embodiments by those skilled in the art without departing from the true spirit and scope of the invention as defined by the appended claims.

What is claimed is:

1. An apparatus for providing haptic feedback, comprising:
    a base defining a pair of through holes at two ends thereof;
    a pair of contacts partially accommodated in the through holes;
    a piezoelectricity vibrator suspended by the contacts with two ends electrically connected to the contacts;
    a cover defining two pressing portions for pressing the two ends of the piezoelectricity vibrator on the contacts, a pair of transmitting beams extending from one of the pressing portions to the other pressing portion, and a transmitting mass clamped into position by the transmitting beams with a lower side abutting against the piezoelectricity vibrator to impart the haptic feedback.

2. The apparatus for providing haptic feedback as described in claim 1 further defines a gap between the piezoelectricity vibrator and a bottom of the base.

3. The apparatus for providing haptic feedback as described in claim 1 further defines an interval between the piezoelectricity vibrator and the transmitting beams.

4. The apparatus for providing haptic feedback as described in claim 1, wherein the base further includes a pair of steps for supporting the piezoelectricity vibrator.

5. The apparatus for providing haptic feedback as described in claim 1, wherein transmitting mass includes an upper side protruding from the transmitting beams.

6. An apparatus for providing haptic feedback, comprising:
    a base defining a receiving space and including a pair of steps therein; a cover; a piezoelectricity vibrator suspended in the receiving space by the steps;
    a pair of contacts partially accommodated in the base and electrically connected to the piezoelectricity vibrator; wherein
    the cover comprises two pressing portions for pressing the two ends of the piezoelectricity vibrator to the contacts on the steps, a pair of transmitting beams extending from one of the pressing portion to the other pressing portion, and a transmitting mass clamped into position by the transmitting beams with a lower side abutting against the piezoelectricity vibrator to impart haptic feedback.

7. The apparatus for providing haptic feedback as described in claim 6 further defines a gap between the piezoelectricity vibrator and a bottom of the base.

8. The apparatus for providing haptic feedback as described in claim 6 further defines an interval between the piezoelectricity vibrator and the transmitting beams.

9. The apparatus for providing haptic feedback as described in claim 6, wherein transmitting mass includes an upper side protruding from the transmitting beams.

10. An electronic device having an apparatus for providing haptic feedback, the apparatus comprising:
    a base defining a receiving space;
    a piezoelectricity vibrator suspended in the receiving space and being capable of vibrating in the receiving space;
    a pair of contacts partially accommodated in the base and electrically connected to the piezoelectricity vibrator;
    a transmitting mass located above the piezoelectricity vibrator with a lower side abutting against the piezoelectricity vibrator and an upper side abutting against an interactive interface of the electronic device to impart the haptic feedback;
    a pair of steps for suspending the piezoelectric vibrator at two ends thereof;
    the contacts suspends the piezoelectricity vibrator at two ends of the piezoelectricity vibrator; and
    a cover having two pressing portions for pressing the two ends of the piezoelectricity vibrator to the contacts on the steps, and a pair of transmitting beams for supporting the transmitting mass.

\* \* \* \* \*